US008631633B2

(12) United States Patent
Monti

(10) Patent No.: US 8,631,633 B2
(45) Date of Patent: Jan. 21, 2014

(54) METHOD FOR SEALING A CONTINUOUS TUBULAR PACKAGE AND A GROUP ACTUATING THE METHOD

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 211 days.

(21) Appl. No.: 12/772,362

(22) Filed: May 3, 2010

(65) Prior Publication Data

US 2010/0281832 A1 Nov. 11, 2010

(30) Foreign Application Priority Data

May 5, 2009 (IT) .............................. BO2009A0272

(51) Int. Cl.
*B65B 9/12* (2006.01)
(52) U.S. Cl.
USPC .................................. 53/552; 53/551; 53/554
(58) Field of Classification Search
USPC ............................. 53/551, 552, 548, 553–555
See application file for complete search history.

(56) References Cited

U.S. PATENT DOCUMENTS

| | | | | | |
|---|---|---|---|---|---|
| 3,027,695 | A | * | 4/1962 | Leasure | 53/451 |
| 3,426,499 | A | * | 2/1969 | Paige | 53/451 |
| 3,482,373 | A | * | 12/1969 | Morris | 53/511 |
| 3,774,509 | A | * | 11/1973 | Heinzer | 493/235 |
| 4,215,520 | A | * | 8/1980 | Heinzer et al. | 53/173 |
| 4,947,621 | A | * | 8/1990 | Christine et al. | 53/451 |
| 5,170,609 | A | * | 12/1992 | Bullock et al. | 53/434 |
| 5,715,656 | A | * | 2/1998 | Pearce | 53/451 |
| 7,963,090 | B2 | * | 6/2011 | Ours et al. | 53/526 |
| 2009/0013655 | A1 | * | 1/2009 | Monti | 53/567 |

OTHER PUBLICATIONS

European Search Report, Search reported dated Sep. 16, 2010.

* cited by examiner

*Primary Examiner* — Andrew M Tecco
(74) *Attorney, Agent, or Firm* — William J. Sapone; Ware Fressola; Maguire & Barber LLP

(57) ABSTRACT

A method is described for sealing a continuous tubular packaging (20), which is fed in a vertical direction, the continuous tubular packaging (20) being shaped as a continuous tubular element (20) exhibiting with a closed bottom (5), in which products are contained, and a group (1) for actuating the method. The group (1) comprises: sealing means (4), configured such as to act in a transversal direction with respect to the continuous tubular packaging (20) in order to separate an inner volume thereof, such that a closed stick pack (2), containing said products, and a new closed bottom (5) are formed; and compression means (8, 9) arranged downstream of the sealing means (4) with respect to the feeding direction (W) of the continuous tubular packaging (20), which are configured such as to compress the continuous tubular packaging (20), consequently eliminating air fluid contained therein, and which are activatable prior to sealing the continuous tubular packaging (20) with the sealing means (4). The method comprises steps of: sealing the continuous tubular packaging (20) in order to separate the internal volume thereof, thus forming a closed stick pack (2), containing the products, and a new closed bottom (5); and compressing the continuous tubular packaging (20), with a consequent evacuation of air fluid contained internally thereof, before sealing the continuous tubular packaging (20).

4 Claims, 5 Drawing Sheets ered from a reel, also known as stick-packs. In particular, the invention relates to a
METHOD FOR SEALING A CONTINUOUS TUBULAR PACKAGE AND A GROUP ACTUATING THE METHOD

FIELD OF THE INVENTION

The present invention relates to a system for packaging loose products in envelopes made of a flimsy material, also known as stick-packs. In particular, the invention relates to a method for sealing a continuous tubular packaging and a group for actuating the method.

DESCRIPTION OF THE PRIOR ART

The prior art comprises machines for packaging products in stick packs which exhibit a vertical development, with output of the full stick packs in the lower zone, comprising: drawing means for intermittently unwinding a continuous sheet from a reel in a supply direction which is downwardly orientated; folding means which receive the continuous sheet in inlet and form in outlet a continuous tubular package which develops vertically and exhibits vertical edges that are superposed and in mutual contact; welding means for sealing the superposed vertical edges of the continuous tubular package; sealing means, arranged downstream of the welding means, for acting transversally on the tubular package forming a closed bottom thereof; dispensing means, activated in phase relation with the first sealing means, for introducing, on the bottom of the continuous tubular package, a batched quantity of product; cutting means, arranged downstream of the sealing means, for cutting from the continuous tubular package a stick pack containing a batched quantity of product and formed following the above-described stage of sealing the continuous tubular package Each tract of the continuous sheet therefore takes on a different configuration as it is moved along the machine, up until it acquires the shape of a stick pack into which a batched quantity of product has been introduced.

The drawing means are mobile pliers having alternating vertical motion for gripping the lower flap of the continuous tubular package, i.e. the lower flap of the lowest stick pack of the continuous tubular package, and impressing a downwards movement of the continuous tubular package corresponding to the desired length of each stick pack. The mobile pliers and the cutting means are activated in phase relation to each other and with the first and second sealing means and with the dispensing means.

The closed stick packs thus obtained exhibit a size which is connected to the relative internal volume, which internal volume is formed by the batched quantity of product introduced thereto and by an undesired quantity of air which has remained trapped during the stage of sealing.

Further, the greater volume of the stick packs makes the superposing of the stick packs problematic during the subsequent packing into containers thereof.

The aim of the present invention consists in providing a technical solution aimed at obviating the drawbacks of the prior art, mentioned herein above, costs of which are contained with respect to the results that are obtained.

SUMMARY OF THE INVENTION

This aim has been attained with a method for sealing a continuous tubular package supplied in a vertical direction and a sealing group which actuates the method.

In accordance with the invention, a group is defined for sealing a continuous tubular package in a vertical direction, the continuous tubular package having the shape of a continuous tubular element provided with a closed bottom, in which the products are contained, comprising:

sealing means configured such as to act transversally of the tubular packaging in order to separate an internal volume thereof, thus forming a closed stick pack, containing the products, and a new closed bottom characterized in that it further comprises: compression means arranged downstream of the sealing means with respect to the supply direction of the continuous tubular packaging, configured such as to compress the continuous tubular packaging with a consequent evacuation of air fluid contained internally thereof and activatable before sealing of the tubular packaging performed by the sealing means.

In accordance with the invention, a method is defined for sealing a continuous tubular packaging supplied in a vertical direction, the continuous tubular packaging having a shape of a continuous tubular element provided with a closed bottom wherein the products are contained, comprising a stage of sealing the continuous tubular packaging in order to separate the internal volume thereof, thus forming a closed stick pack containing the products, and a new closed bottom, characterized in that it further comprises a stage of compressing the continuous tubular packaging, with a consequent evacuation of air fluid contained therein, before sealing the continuous tubular packaging.

The fact of compressing the continuous tubular packaging before the relative sealing advantageously enables evacuating the air fluid contained internally thereof: the closed stick packs thus obtained exhibit an internal volume which is constituted substantially by the batched quantity of product, with all the positive implications this brings.

BRIEF DESCRIPTION OF THE DRAWINGS

Specific embodiments of the invention, and advantageous technical-functional characteristics thereof related to the embodiments, only partly deducible from the above description, will be described in the following, in accordance with what is set out in the claims and with the aid of the accompanying figures of the drawings, in which:

DESCRIPTION OF THE PREFERRED EMBODIMENTS

Figure 1:
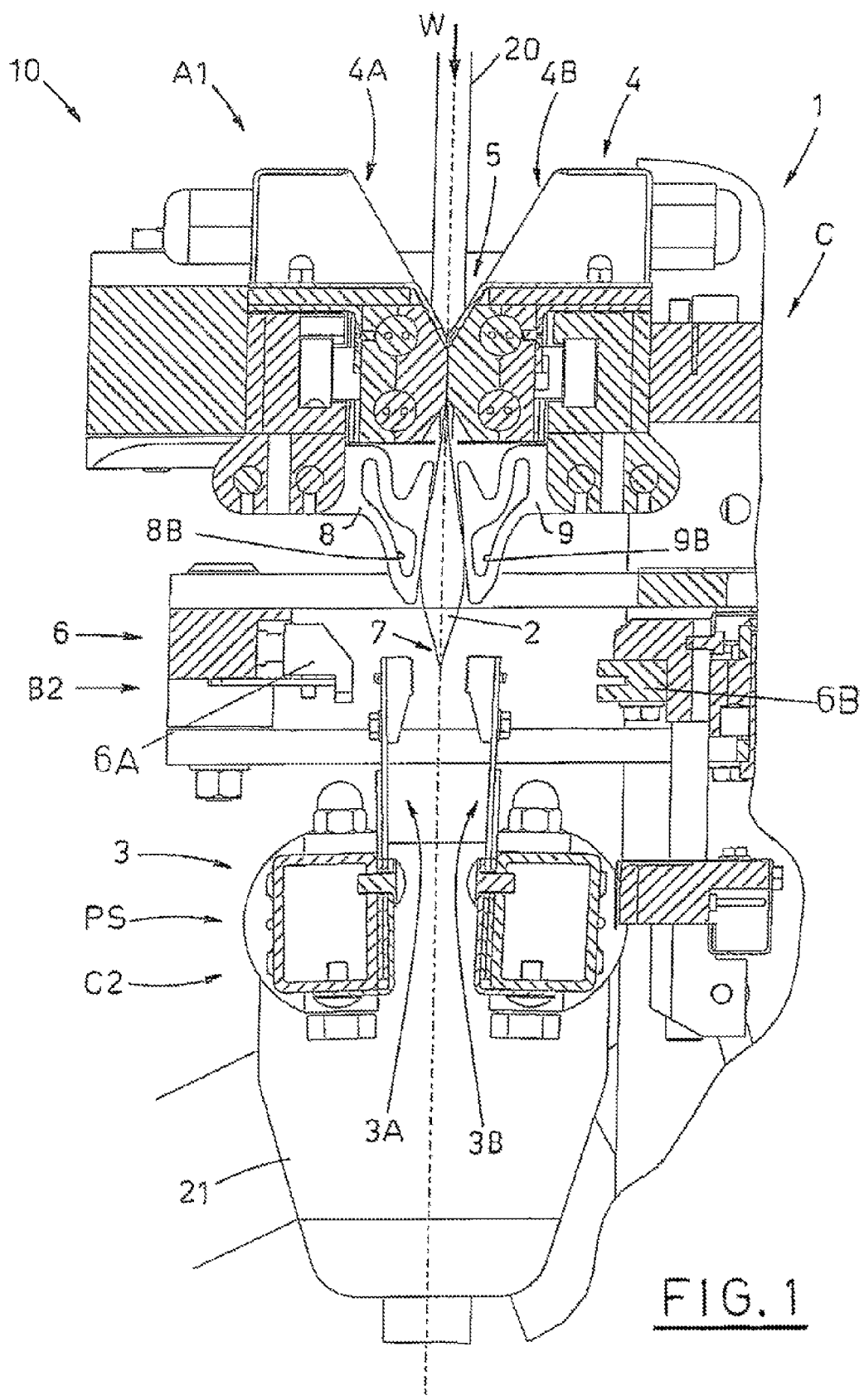
FIGS. 1-5 illustrate a transversal section of a system for packaging products in stick packs, during five operating stages thereof.

With reference to the accompanying figures of the drawings, a preferred embodiment is illustrated of a part of a system for packaging products in stick packs, denoted by reference numeral 10, comprising the sealing group 1 which is object of the present invention.

Only the parts of the system 10 which directly cooperate with the sealing group have been illustrated, though other parts not represented, of known type, will be mentioned in general terms in the following description, without reference numerals.

The system 10 exhibits a vertical development with the outlet of the stick packs 2 in the lower zone U, and comprises: drawing means 3 for intermittently unwinding a continuous sheet from a reel in a supply direction W directed downwards; folding means which receive the continuous sheet in inlet and form in outlet a continuous tubular packaging 20 which develops vertically and exhibits vertical edges that are superposed in mutual contact; welding means for sealing the superposed vertical edges of the continuous tubular packaging 20;

sealing means 4 arranged downstream of the welding means, for acting transversely on the continuous tubular packaging 20 to form an overlying closed bottom 5; dispensing means, activated in phase relation with the activation of the welding means and the sealing means 4, for releasing, on the bottom 5 of the continuous tubular packaging 20 a batched quantity of product; cutting means 6, comprising two abutting heads 6A, 6B which respectively bear a blade and a counter-blade, acting downstream of the sealing means 4 for cutting from the continuous tubular packaging 20 the stick pack 2 containing a batched quantity of product and formed following the above-described sealing stages of the continuous tubular packaging 20.

The drawing means 3 are mobile pliers having vertical alternating motion for gripping the flow flap of the continuous tubular packaging 20, i.e. the lower flap 7 of the envelope 2 of the continuous tubular packaging 20, and for impressing a downwards movement on the continuous tubular packaging 20; the movement that the mobile pliers 3 impose time by time on the continuous tubular packaging 20 corresponds to the length of each stick pack 2 which it is desired to obtain.

As will clearly emerge from the present description, the mobile pliers 3, the cutting means 6 and the sealing means 4 are activated in suitable phase relation with one another. The sealing group 1 of the invention comprises: the above-mentioned sealing means 4, comprising two sealing heads, a first sealing head 4A and a second sealing head 4B, mobile in mutual nearing and distancing; and compression means, comprising two deformable elements, a first deformable element 8 and a second deformable element 9, mounted respectively below the welding heads 4A, 4B for acting respectively on the lower lateral walls 2A, 2B of the stick pack 2 under formation.

The deformable elements 8, 9 are mounted such as to project from the sealing heads 4A, 4B; thus the deformable elements 8, 9 act on the lower lateral walls 2A,2B of the stick pack 2 under formation of the continuous tubular packaging 20 prior to the welding heads 4A, 4B; the compression exerted by the deformable elements 8, 9 on the continuous tubular packaging 20 pushes the air upwards along the continuous tubular packaging 20, beyond the sealing heads 4A, 4B.

The application of the sealing heads 4A, 4B against the lateral walls of the continuous tubular packaging 20 determines the formation of an underlying closed stick pack 2, containing a batched quantity of product, and an overlying new closed bottom 5 of the continuous tubular packaging 20.

The closed stick pack 2 thus formed advantageously exhibits an internal volume substantially constituted by a batched quantity of product: the air has been almost totally expelled before the sealing of the continuous tubular packaging 20 thanks to the compressive action exerted by the stick pack 2 being formed by the deformable elements 8, 9.

The deformable elements 8, 9 each exhibit, for example, a surface 8A, 9A which is inclined downwards with respect to the supply direction W of the continuous tubular packaging 20. This facilitates evacuation of the air before the stage of sealing performed by the second sealing means 4; during the compression stage the deformable elements 8, 9 contact the lower lateral walls 2A, 2B of the stick pack 2 under formation of the tubular packaging 20, and are moved along a contact surface which progressively grows and expands in an upwards direction, which enables the air to be effectively conveyed beyond the sealing heads 4A, 4B (see the arrows schematically represented on the continuous tubular packaging 20 in FIG. 4).

In the embodiment illustrated in the figures, each deformable element 8, 9 affords a through-hole 8B, 9B for increasing the degree of flexibility; alternatively, or additionally, one or more undercuts can be fashioned.

The deformable elements 8, 9 are for example made of silicone; other deformable materials could also be used which are able to resist the temperatures which are reached in proximity of the sealing heads 4A, 4B. Advantageously the use of silicone enables a predetermined friction to be exerted on the continuous tubular packaging 20 when the deformable elements 8, 9 compress the continuous tubular packaging 20.

The deformable elements 8, 9, as mentioned, are respectively borne by the sealing heads 4A, 4B, and perform a nearing/distancing movement in a horizontal direction; the deformable elements 8, 9 are also configured such that following the intercepting of the continuous tubular packaging 20, they exert thereon not only a lateral compression but also a traction force in a same direction as the supply direction W of the continuous tubular package 20. In other words, the deformable elements 8, 9 exert on the continuous tubular packaging 20 opposite horizontal compressive forces and a substantially vertical force which tensions the continuous tubular packages 20, in the same direction as the supply direction W. This derives in particular: from the fact that the deformable elements 8, 9 exhibit inclined surfaces 8A, 9A in a downwards direction with respect to the supply direction W; from the shape of the central zone of the deformable elements 8, 9 in which the through-holes 8B, 9B are afforded; and from the conformation of the through-holes 8B, 9B (which in general can also be undercuts, as mentioned herein above).

The above description of the packaging system 10 implicitly relates to a single channel C (illustrated in FIGS. 1-5), but is equally valid for a multi-channel packaging system 10. A multi-channel packaging system 10 generally comprises a plurality of identical flanked channels, in each of which operate drawing means 3, the first sealing means, the dispensing means, the sealing group 1 and the cutting means 6. In this case one common sheet is wound on a reel and a supplementary station arranged downstream cuts the common sheet into longitudinal portions which supply the various channels.

In particular, single function units are predisposed which operate contemporaneously on all the channels. For example, one sealing group only is provided, constituted by the sealing heads and a number of pairs of deformable elements which is equal to the number of channels, a single cutting group, constituted by a blade and a counter-blade, and a single gripping and drawing group constituted by a common member 21 moving alternatingly vertically, which bears a number of pliers which is the same as the number of channels.

For a multi-channel packaging system of this type, the use of pairs of deformable elements 8, 9 associated to each single channel has been shown to be extremely advantageous: this is thanks to the tensioning effect that each pair of deformable elements 8, 9 exerts singly on each corresponding continuous tubular packaging 20 before the intervention of the sealing heads 4A, 4B.

The prior art teaches that the tensioning of each continuous tubular packaging 20 along a corresponding channel is not known a priori and depends on various factors, such as the friction that the folding elements exert on the single longitudinal portions of sheet, the presence of dirt in the channels, the peripheral or central position of the channels (usually peripheral channels are more tensioned with respect to central channels) etc.: as a consequence of the different tensioning along the channels the lower flaps 7 of the continuous tubular packages 20 are not usually at the same height, such that the subsequent cutting can lead to the formation of stick packs 2 of different lengths. This difference in tensioning of the channels cannot be compensated for by the drawing and gripping group, which acts continuously on all the channels.

Each single pair of deformable elements 8, 9 advantageously exerts a certain tensioning on a corresponding continuous tubular packaging 20: if the continuous tubular packaging 20 is already sufficiently tensioned, the action of the deformable elements 8, 9 is irrelevant; differently, the action exerted by the deformable elements 8, 9 will tend to "stretch" the corresponding continuous tubular element 20 more greatly, with a consequent lowering of the low flap 7. Overall, the action of the deformable elements 8, 9 fixed to the sealing heads 4A, 4B will tend to annul the staggering in height which occurs between the flaps 7 of the continuous tubular packaging 20 associated to different channels and will therefore facilitate the formation of stick packs 2 of a same size.

There follows a description of the operating stages of the system for packaging products in stick packs, illustrated in FIGS. 1 to 5 with reference to an operating cycle, from which it is possible to deduce the phase relations between the dispensing means, the sealing group 1, the cutting means 6, the pliers 3 and the pick-up group 16 of the stick pack 2 in the lower zone U (illustrated in FIGS. 4, 5), also part of the packaging system 10.

In FIG. 1 the sealing heads 4A, 4B are arranged in an engaged position A1 in which they are in mutual contact in order to seal a portion of the continuous tubular packaging 20, forming an underlying stick pack 2 and an overlying closed bottom 5; the deformable elements 8, 9 compress the stick pack 2 thus formed, contacting the lateral walls 2A, 2B of the stick pack. The cutting means 6 are in a disengaged position B2. The pliers 3 are in a raised position PS and the relative jaws 3A, 3B are in a disengaged position C2.

When the deformable elements 8, 9 contact the lateral walls of the stick pack 2 they guarantee a stable and certain positioning of the stick pack 2, which advantageously facilitates the following grip of the lower flap 7 of the stick pack 2 by the pliers 3. Further, the certain knowledge of the position of the stick pack 2 enables reducing the opening of the jaws 3A, 3B of the pliers 3 to a minimum and thus reducing the run of the jaws 3A, 3B from the engaged position C1, in which the jaws 3A, 3B grip the lower flap 7 of the stick pack 2, and the disengaged position C2, in which the jaws 3A, 3B are opened. This enables the productivity of the packaging system 10 to be increased, thanks to the certain knowledge of the position assumed time by time by each stick pack 2.

In prior art solutions, on the other hand, one or more stick packs were supported only by the tops thereof and could therefore oscillate about an equilibrium position, such that the position thereof was not precisely known during the functioning of the system: further, residual welding tension and/or residual tensions in the polymer material of the stick pack might combine to determine an equilibrium position of the stick pack which was different from the vertical position. Consequently, the jaws of the pliers had to be kept in an open position with an angular opening that took account of the uncertainty of the position assumable by the stick pack. Notwithstanding this, impacts between the jaws and the stick pack were not infrequent, which impacts prevented the stick pack from being gripped or even wrinkled it up, causing blockage in the packaging machine.

The solution of the present invention advantageously solves these drawbacks, as described herein above.

Following sealing of the continuous tubular packaging 20 by the sealing heads 4A, 4B, the dispensing means are activated to release a batched quantity of product (not illustrated) onto the closed bottom 5 thus formed.

Figure 2:
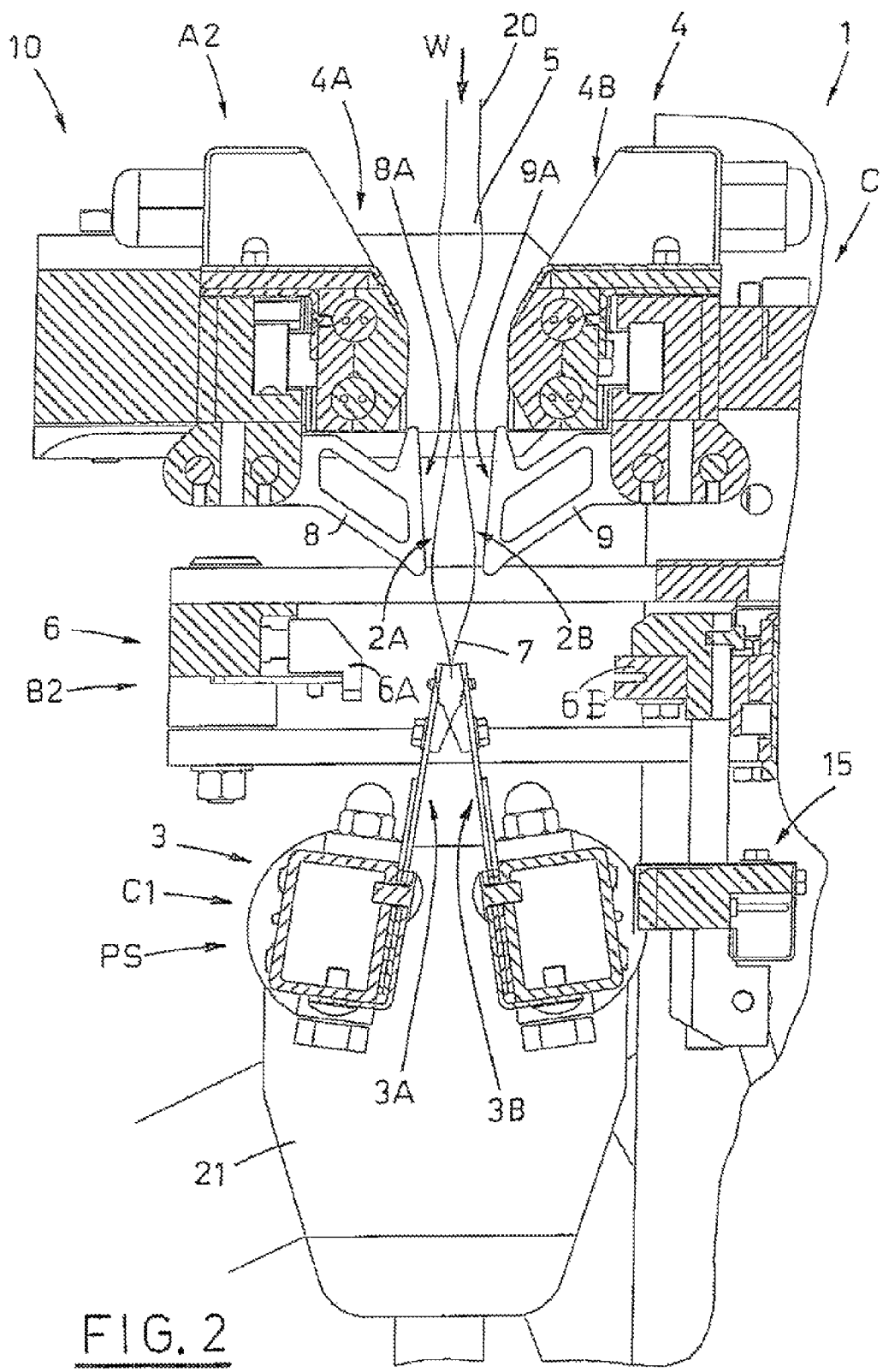

In FIG. 2 the sealing heads 4A, 4B have reached a disengaged position A2 and the jaws 3A, 3B of the pliers 3 have reached an engaged position C1, in which they grip the lower flap 7 of the stick pack 2.

In particular, the system 10 is activated such that the jaws 3A, 3B grip the lower flap 7 of the stick pack 2 before (or immediately after) the deformable elements 8, 9 have become completely disengaged from the lateral walls 2A, 2B of the stick pack 2 itself; in this way the stick pack 2 is gripped by the pliers 3 when it is still in a certain position, i.e. substantially vertical.

Figure 3:
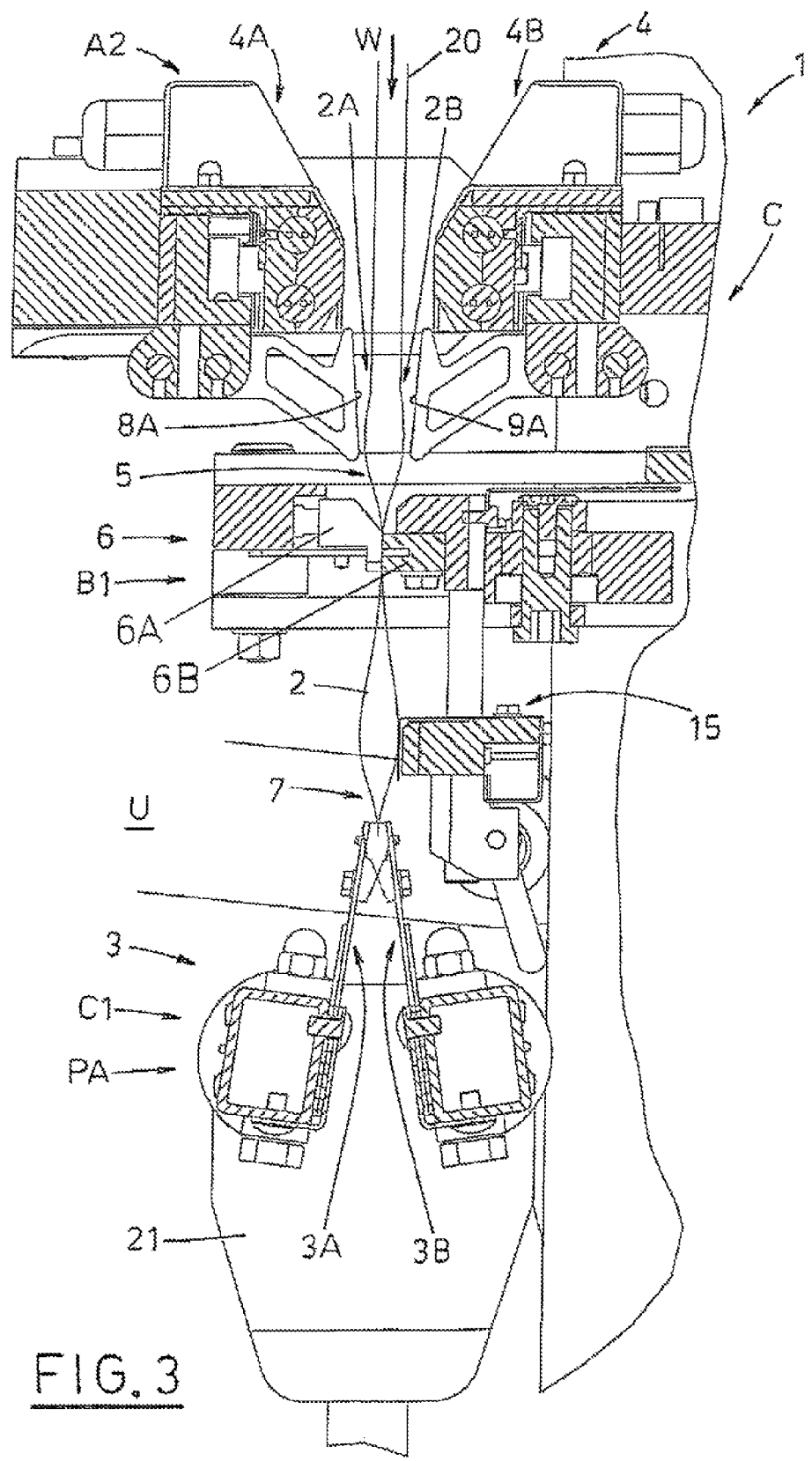

In FIG. 3 the cutting means 6 have reached an engaging position B1 in which the relative abutting heads 6A, 6B grip the stick pack 2 and the pliers 3, while the jaws 3A, 3B in the engaged position C1, have reached a lowered position PA which has brought the stick pack 2 into the lower zone U of the packaging system 10.

In the position illustrated in FIG. 3, the stick pack 2 laterally contacts an abutment 15 of the packaging system 10.

Figure 4:
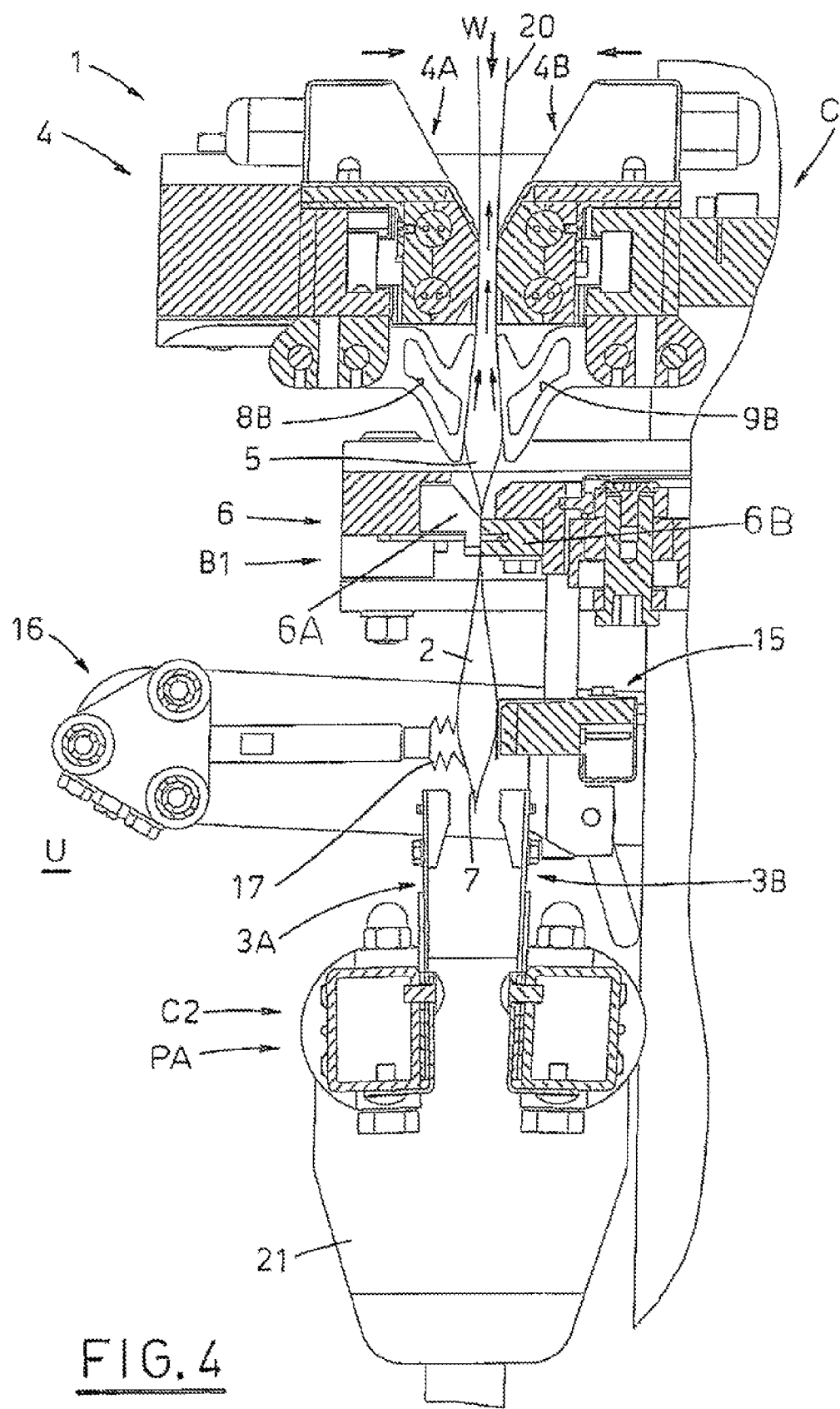

In FIG. 4 the cutting means 6, which are in the engaged position B1, cut the stick pack 2 from the continuous tubular packaging 20. FIG. 4 also illustrates pick-up organs 16, also belonging to the packaging system 10 and acting horizontally to pick up a stick pack 2 arranged in the lower zone U in contact with the abutment 15. The pick-up organs 16 are provided for example with suckers 17 and are represented in FIG. 4 in the act of picking up the stick pack 2.

In FIG. 4 the jaws 3A, 3B of the pliers 3, which are in the lowered position PA, have reached the disengaged position C2 in which they have released the lower flap 7 of the stick pack 2, while the sealing heads 4A, 4B are reaching the engaged position A1.

The movement of the jaws 3A, 3B into the disengaged position C2 occurs in phase relation with the picking-up of the stick pack 2 by the pick-up organs 16.

Figure 5:
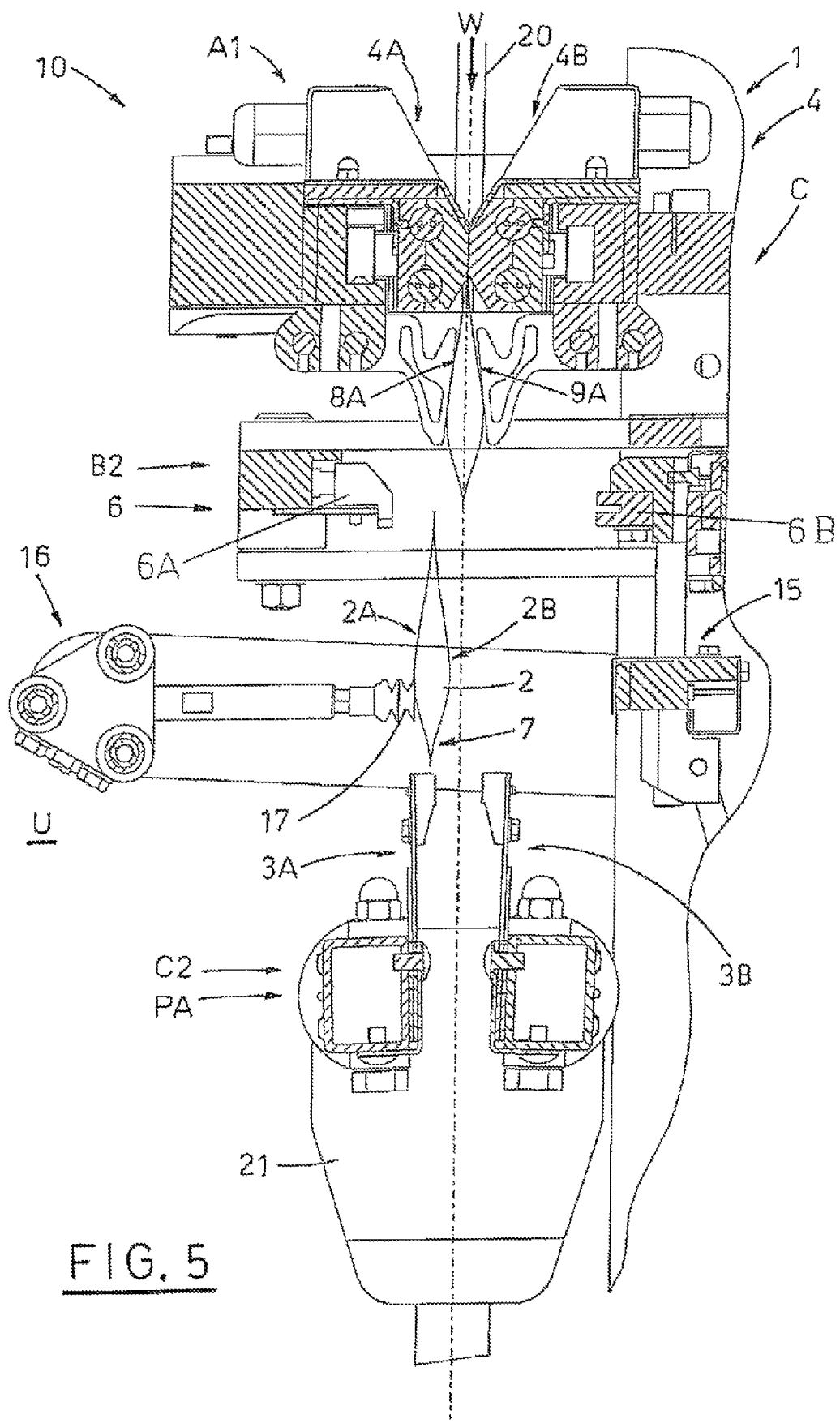

In FIG. 5 the sealing heads 4A, 4B have reached the engaged position A1, the cutting means 6 have reached the disengaged position B2 and the pick-up organs 16 are bringing the stick pack 2 away from the lower zone U.

The above has been described by way of non-limiting example, and any constructional variants are considered to fall within the ambit of protection of the present technical solution, as claimed in the following.

The invention claimed is:

1. A system for packaging products in stick packs formed from a continuous tubular element, the system comprising:
a gripping and dragging device acting with a vertical alternating motion and having pliers which grip a lower edge of a closed bottom of the continuous tubular element forming a stick pack, the gripping and dragging device step-wise feeding the continuous tubular element through the system by dragging the closed bottom of the stick pack and the continuous tubular element in a downward feeding direction by a step corresponding to a longitudinal extension of the stick pack,
a pack sealer, adapted to act in a transversal direction with respect to the continuous tubular element in order to seal overlaying portions thereof to form a closed bottom of a subsequent stick pack and a closed top of the stick pack which has been filled with a product after the closed bottom was formed;
a pair of deformable compression elements arranged downstream of the pack sealer with respect to the feeding direction of the continuous tubular element, and being attached thereto for transversal movement therewith, the pair of deformable compression elements arranged in a facing relationship such that each filled stick pack is positionable therebetween, each deformable compression element having an upstream deformable arm and a downstream deformable arm, the upstream and downstream deformable arms supporting an inclined engaging surface, the pair of deformable compression elements adapted to compress each filled stick pack for eliminating air contained therein, the deformable arms of the pair of deformable elements being physically deformed during compression of each filled stick pack, the pair of deformable compression elements in an undeformed configuration each having the inclined engaging surfaces with upper portions of the facing engaging surfaces spaced further away from each other than lower portions thereof, being inclined when activated, the pair of compression elements move horizontally towards each other together with the pack sealer, and the lower portions of each engaging surface first engage bottom portions of lateral walls of the stick pack to hold the closed bottom in a set position, with the downstream arms of the deformable compression elements being deformed between the moving pack sealer and the stationary stick pack disposed therebetween, with a progressive upward contact of the engaging surfaces with the lateral walls of the stick pack and a corresponding upwards deformation of the engaging surface and the upstream deformable arm along a contour of the stick pack so as to convey air in the stick pack in an upward direction for removal therefrom before sealing of the stick pack, during compression of the stick pack, the pair of compression elements transition to a deformed configuration, wherein the upstream and downstream deformable arms are deformed, and the facing engaging surfaces exhibit a change in inclination such that the upper portions of each compression element are closer to each other than the lower portions thereof, the inclined surfaces being inclined upwardly with respect to the feeding direction, the deformed engaging surfaces tensioning the stick pack in the feeding direction, and holding the stick pack in the set position to facilitate engagement of the closed bottom of the filled and compressed stick pack by the gripping and dragging device;

a cutter arranged downstream of the pack sealer and the compression elements, the cutter acting horizontally to cut through the sealed overlaying portions for separating each filed and compressed stick pack from each stick pack disposed thereabove, the stick pack disposed thereabove held in position after cutting by the activated compression elements;

pick-up organs acting horizontally and configured to engage the filled and compressed stick pack gripped by the gripping and dragging device prior to the cutter separating each filled and compressed stick pack from each stick pack disposed thereabove, and after cutting, the pick-up organs removing the separated filled and compressed stick pack, the gripping and dragging device disengaging from each filled and compressed stick pack in phase relation with the engaging of each filled and compressed stick pack by the pick-up organs, wherein the cutter, gripping and dragging device and pick-up organs are activated in phase relation with respect to each other and with respect to the activating of the pack sealer and the compression elements, the disengaged gripping and dragging device then moved vertically upwardly to the set position for gripping and dragging the closed bottom of another filled stick pack held in the set position by the compression elements.

2. The system of claim 1, wherein the pack sealer comprises two welding heads adapted to move towards or away from one another and wherein the compression elements comprise two projecting deformable elements, mounted opposite one another on the two welding heads.

3. The system of claim 2, wherein each deformable element is provided with at least an undercut or a through-hole for increasing a degree of deformability thereof.

4. The system of claim 2, wherein the deformable elements are made of silicone.

\* \* \* \* \*